Nov. 19, 1968 V. J. CUSHING 3,411,355
ELECTROMAGNETIC VOLUMETRIC FLOWMETER
Filed June 17, 1966

INVENTOR
VINCENT J. CUSHING

BY Shoemaker and Mattare
ATTORNEYS

United States Patent Office 3,411,355
Patented Nov. 19, 1968

3,411,355
ELECTROMAGNETIC VOLUMETRIC FLOWMETER
Vincent J. Cushing, 9804 Hillridge Drive,
Kensington, Md. 20795
Filed June 17, 1966, Ser. No. 558,486
5 Claims. (Cl. 73—194)

ABSTRACT OF THE DISCLOSURE

Two detecting electrodes are disposed at opposite sides of a flow conduit, and a guard means is disposed adjacent a high impedance electrode which is connected with the high impedance input of a negative gain amplifier. The output of the amplifier is connected with the other of the electrodes which comprises a low impedance electrode. The electrical network includes means for maintaining the guard means and the reference level of the amplifier means at the same potential. Shield means is also disposed outwardly of the high impedance electrode.

---

Figure 1:
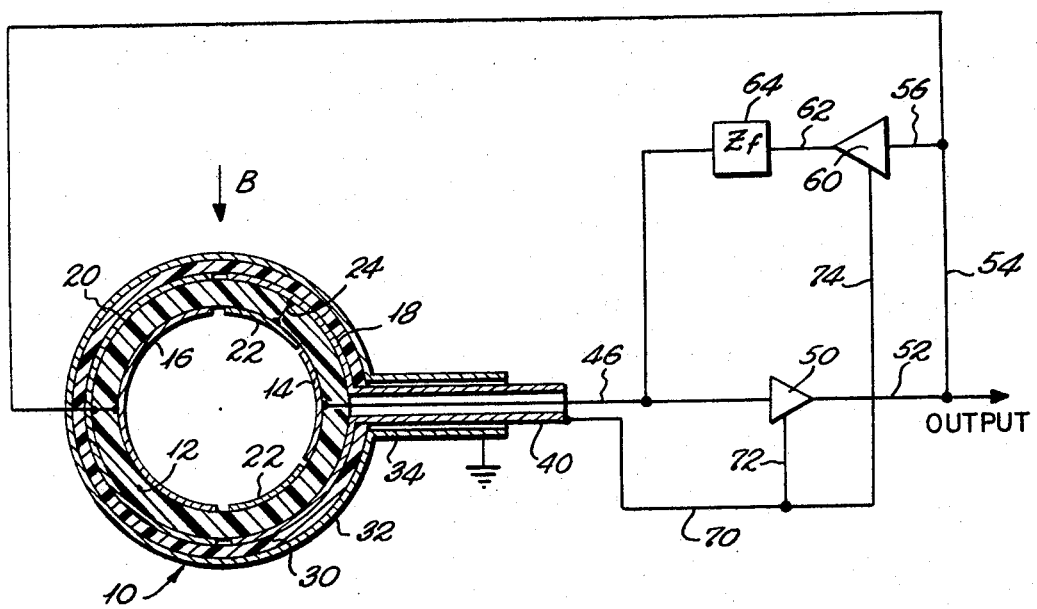

The present invention relates to an electromagnetic volumetric flowmeter for measuring volumetric flow rate for conductive as well as dielectric fluids.

The present invention is an electromagnetic flowmeter employing an alternating magnetic induction in order to avoid polarization at the electrodes and to avoid stray potentials due to thermoelectric and electrochemical effects.

In the arrangement of the present invention, at least two separate detecting electrodes are electrically insulated from one another and are provided adjacent a tubular means through which the metered fluid is adapted to flow. At least one of these detecting electrodes is a relatively high impedance electrode, and at least one other of these detecting electrodes is a relatively low impedance electrode. Means is provided for producing an alternating magnetic field within the tubular means, and the detecting electrodes are connected in an electrical network which electrically connects the detecting electrodes in a unique manner to provide the desired results.

The flowmeter of the present invention also employs a guard means in combination with the detecting electrodes, this guard means may include a shield means disposed directly outwardly of each of the detecting electrodes in order to minimize current losses from the detecting electrodes to ground to obtain accurate results with the apparatus. The guard means includes a guard ring disposed about the relatively high impedance electrodes and spaced substantially uniformly from the outer edges thereof for obviating the problem of so-called edge effects or end-shorting, the guard ring and the shield means being electrically interconnected with one another.

The electrical network includes a first amplifier means connected with the relatively high imperance detecting electrode, and provides a relatively large negative feedback from said first amplifier means to the relatively low impedance detecting electrode. The network also includes a second amplifier means that provides phase inversion and provides a regenerative feedback path to the input of said first-mentioned amplifier means through a feedback impedance so that the detected voltage is equal to the flow generated voltage and is independent of the electrical properties of the metered fluid.

An object of the present invention is to provide a new and novel electromagnetic flowmeter especially adapted for use with dielectric fluides.

Another object of the invention is the provision of an electromagnetic flowmeter adapted to detect volumetric flow rate.

A further object of the invention is the provision of an electromagnetic flowmeter including means for minimizing current losses from the detecting electrodes to ground and further to eliminate the problem of so-called end-shorting of a relatively high impedance detecting electrode.

Still another object of the invention is to provide an electromagnetic flowmeter including means ensuring that the detected voltage is equal to the flow generated voltage and is independent of the electrical properties of the metered fluid.

A still further object of the invention is the provision of an electromagnetic flowmeter which is quite simple and inexpensive in construction, is relatively light-weight and of small size, and which at the same time is quite efficient and reliable in use.

Figure 2:
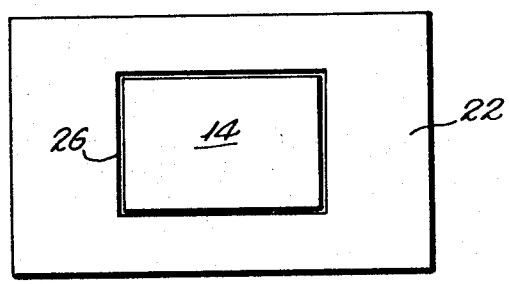

Other objects and many attendant advantages of the invention will become more apparent when considered in connection with the specification and accompanying drawings, wherein:

FIG. 1 is a somewhat schematic illustration of a flewmeter apparatus according to the present invention; and FIG. 2 is a view illustrating a detecting electrode and its associated guard ring in its developed or planar form.

Referring now to the drawings wherein like reference characters designate corresponding parts throughout the views, the transducer portion of the apparatus is indicated generally by reference numeral 10 in FIG. 1 and is shown in cross section. The transducer portion includes a generally cylindrical tubular means 12 of suitable dielectric material such as fiberglass, plastic and the like having the necessary dielectric and magnetic properties. A pair of detecting electrodes 14 and 16 are provided, these electrodes being separate and electrically insulated from one another and disposed preferably at diametrically opposite inner portions of member 12. As illustrated, detecting electrodes 14 and 16 are suitably supported on the inner surface of member 12 and are in direct contact with fluid flowing through the tubular means. If desired, a thin liner of suitable dielectric material such as Teflon or the like may be provided inwardly of electrodes 14 and 16 and in concentric relationship with member 12.

The transducer portion includes guard means including a pair of shield means 18 and 20 each of which is disposed substantially directly outwardly of the associated detecting electrodes 14 and 16 respectively. These two shield means are spaced from one another so as to be insulated from one another, the shield means as well as the detecting electrodes being formed of a suitable electrically conductive metallic substance such as copper or the like and being thin to minimize eddy currents.

The guard means also includes a guard ring 22 which is suitably mounted on the inner surface of member 12 and is interconnected with shield means 18 by electrical lead 24.

Referring now to FIG. 2, the developed or planar form of the detecting electrode 14 and guard ring 22 is illustrated. As seen in this figure, detecting electrode 14 is substantially rectangular in configuration and the guard ring 22 is also substantially rectangular and includes a central rectangular cutout portion which is slightly greater than the outer dimensions of the detecting electrode 14 so as to provide a clearance 26 all the way around the outer edges of the detecting electrode. Accordingly, when the two electrodes as seen in FIG. 2 are disposed in operative position, the guard ring is disposed in spaced relationship to the detecting electrode and provides a substantially uniform space completely around the peripheral edge portions of the detecting electrode.

The shield means 18 and 20 are mounted on the outer surface of member 12 and are in turn surrounded by a generally cylindrical member 30 which may be of a suitable dielectric material similar to that of member 12. Member 30 is in turn surrounded by a ground means 32 which may be in the form of an electrically conductive layer of material connected with a coaxial lead 34 which in turn is connected with ground.

In some instances wherein it is desired to operate the guard means at ground potential, shield means 18 and 20 may be eliminated and the guard ring 22 connected directly to the ground means 32. With such an arrangement, when the guard ring is connected to the ground means, it should be understood that the ground means effectively serves as a shield means disposed directly outwardly of the detecting electrodes.

It should be noted that the tubular means and the associated components may have a cross-sectional configuration other than circular if so desired, the illustrated embodiment being considered preferable.

Suitable means such as a magnet winding (not shown) may be provided about the transducer portion shown for providing an alternating magnetic induction field, this field being indicated schematically by the symbol B in FIG. 1.

It will be understood that in the transducer portion shown in FIG. 1, the flow of fluid is perpendicular to the plane of the paper and that the alternating magnetic induction field B is transverse to the axis of the tubular means through which the fluid flows. The detecting electrodes and the guard ring as disposed at substantially the same radial distance from the center of the tubular means through which the fluid flows, and the shield means 18 and 20 are disposed at a greater radius from the center of the tubular means and are separated from the detecting electrodes by a dielectric medium.

A tubular lead 40 substantially coaxial with the aforementioned lead 34 is electrically connected with the guard means including shield means 18 and guard ring 22.

The relatively high impedance electrode 14 is connected with a lead 46 disposed coaxially within tubular lead 40, lead 46 being connected with a first amplifier 50 the output of which is connected through lead 52 with a suitable output means. Lead 52 is also connected with a lead 54 which in turn is connected with the relatively low impedance detecting electrode 16, and with this interconnection, relatively large negative feedback is effectively provided to detecting electrode 16 which drives the detecting electrode 14 toward the same potential as its attendant guard means.

It is well known in electrical practice that we can measure terminal voltage in a generator such as in an electromagnetic flowmeter, provided the external load such as the associated electrical network is high impedance. In fact, the load impedance must be many times higher than the generator's internal impedance for accuracy. Therefore, of the two terminals of the associated electrical network which are connected to the two detecting electrodes, at least one of the terminals must have a high input impedance. As the term is employed in this case, a detecting electrode which is electrically connected to a high input impedance terminal of the associated electrical network is called a high impedance detecting electrode.

Lead 54 is also connected by lead 56 with the input of a phase inverting amplifier 60 the output of which is connected with a lead 62 which is in turn connected through a feedback impedance 64 with lead 46 as shown. This arrangement provides a regenerative feedback path from the output of amplifier 60 to the input of amplifier 50 through the feedback impedance 64 which may in a typical example take the form of a high quality temperature stabilzed capacitor.

The proper gain setting of phase inverting amplifier 60 may be established in terms of flowmeter and amplifier circuit parameters which are enitrely independent of the electrical properties of the metered fluid. With the gain setting suitably established, the detected voltage is proportional to the flow generated voltage and is independent of the electrical properties of the fluid.

Tubular lead 40 is connected with a lead 70 which in turn is connected by leads 72 and 74 with the reference level connections of amplifiers 50 and 60 respectively.

The electrical network associated with the transducer portion of the invention ensures that the detecting electrode 14 and the adjacent guard means including shield means 18 and guard ring 22 are at substantially the same flow generated potential to eliminate the effect of fringe capacity and ground capacity.

It is apparent from the foregoing that there is provided according to the present invention new and novel electromagnetic flowmeter apparatus especially adapted for use with dielectric fluids and which is adapted to indicate volumetric flow rate. Means are provided for minimizing current losses from the detecting electrodes to ground and further to eliminate the problem of so-called end-shorting of a relatively high impedance detecting electrode. Means are also provided for ensuring that the detected voltage is substantially equal to the flow generated voltage and is independent of the electrical properties of the fluid. The flowmeter is quite simple and inexpensive in construction, is relatively lightweight and of small size, and at the same time is quite efficient and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another, one of said electrodes being a relatively high impedance electrode and another of said electrodes being a relatively low impedance electrode, guard means disposed adjacent said high impedance electrode, an electrical network electrically connected with said detecting electrodes, said network including amplifier means connected with said high impedance electrode, means providing a relatively large negative feedback from said amplifier means to said low impedanec electrode, and means for maintaining said guard means and the reference level of said amplifier means at the same potential.

2. Apparatus as defined in claim 1 wherein said guard means includes shield means disposed outwardly of said high impedance electrode.

3. Apparatus as defined in claim 1 wherein said guard means includes a guard ring disposed in closely spaced relationship to said high impedance electrode and substantially uniformly spaced about the outer edges of said high impedance electrode.

4. Apparatus as defined in claim 1 wherein said guard means includes shield means disposed outwardly of said high impedance electrode and a guard ring disposed in closely spaced relationship to said high impedance electrode and substantially uniformly spaced about the outer edges thereof.

5. Apparatus as defined in claim 1 wherein said network includes means providing a regenerative feedback path from the output of said amplifier to the input of said amplifier means through a feedback impedance so that the detected voltage is equal to the flow generated voltage and is independent of the electrical properties of the metered fluid.

References Cited

UNITED STATES PATENTS

| | | | |
|---|---|---|---|
| 2,733,604 | 2/1956 | Coulter | 73—194 |
| 3,178,941 | 4/1965 | Berry | 73—194 |

FOREIGN PATENTS

| | | |
|---|---|---|
| 1,357,184 | 2/1964 | France. |

RICHARD C. QUEISSER, *Primary Examiner.*

CHARLES A. RUEHL, *Assistant Examiner.*